United States Patent
Koike

(10) Patent No.: US 10,481,843 B1
(45) Date of Patent: Nov. 19, 2019

(54) INFORMATION PROCESSING APPARATUS AND INFORMATION STORAGE MEDIUM WITH LISTING OF ERROR DATA AND LIST ACQUISITION

(71) Applicant: TOSHIBA TEC KABUSHIKI KAISHA, Shinagawa-ku, Tokyo (JP)

(72) Inventor: Sho Koike, Shimizu Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/054,677

(22) Filed: Aug. 3, 2018

(51) Int. Cl.
*G06F 3/12* (2006.01)
*H04N 1/00* (2006.01)

(52) U.S. Cl.
CPC .......... *G06F 3/1229* (2013.01); *G06F 3/1204* (2013.01); *G06F 3/1287* (2013.01); *H04N 1/00344* (2013.01); *H04N 1/00538* (2013.01)

(58) Field of Classification Search
CPC .... G06F 3/1229; G06F 3/1204; G06F 3/1287; H04N 1/00344; H04N 1/00538
USPC ........................................ 358/1.1–1.18, 402
See application file for complete search history.

(56) References Cited

U.S. PATENT DOCUMENTS

| | | | |
|---|---|---|---|
| 7,156,391 B2* | 1/2007 | Okamoto | B65H 7/20 271/258.01 |
| 2003/0020942 A1* | 1/2003 | Teres | G06K 15/00 358/1.14 |
| 2009/0292700 A1* | 11/2009 | Castellani | G06N 5/025 |
| 2014/0068757 A1* | 3/2014 | Komatsu | H04L 63/083 726/19 |
| 2014/0297628 A1* | 10/2014 | Tsuji | G06F 16/3346 707/723 |

FOREIGN PATENT DOCUMENTS

| JP | 2005-301413 A | 10/2005 |
|---|---|---|
| JP | 2011-121222 A | 6/2011 |

* cited by examiner

*Primary Examiner* — Gabriel I Garcia
(74) *Attorney, Agent, or Firm* — Foley & Lardner LLP

(57) ABSTRACT

An information processing apparatus includes a processor and a memory configured to store a command for operating the processor. The processor acquires a first list including a plurality of error data, each of which includes information indicating a cause of an error occurring in an image forming apparatus, and adds up the number of occurrence times of each of plural cause candidates relating to the error based on the first list. The processor further ranks the plural cause candidates depending on the number of occurrence times, and generates a second list in which each of the plural cause candidates and a rank are associated with each other.

17 Claims, 9 Drawing Sheets

FIG.5

| IDENTIFICATION INFORMATION | ERROR CAUSE |
|---|---|
| ERROR 100 | REPLACEMENT OF PART 1 |
| ERROR 100 | REPLACEMENT OF PART 2 |
| ERROR 100 | REPLACEMENT OF PART 3 |
| ERROR 110 | REPLACEMENT OF PART 1 |
| ERROR 110 | REPLACEMENT OF PART 2 |
| ... | ... |

FIG.6

ERROR 100

| RANK | CAUSE CANDIDATE (ERROR CAUSE) | NUMBER OF OCCURRENCE TIMES |
|---|---|---|
| 1 | REPLACEMENT OF PART 1 | 10 |
| 2 | REPLACEMENT OF PART 2 | 6 |
| 3 | REPLACEMENT OF PART 3 | 2 |
| ... | ... | ... |

| ERROR 110 | | |
|---|---|---|
| RANK | CAUSE CANDIDATE (ERROR CAUSE) | NUMBER OF OCCURRENCE TIMES |
| 1 | REPLACEMENT OF PART 3 | 8 |
| 2 | REPLACEMENT OF PART 2 | 6 |
| 3 | REPLACEMENT OF PART 1 | 1 |
| ... | ... | ... |

INFORMATION PROCESSING APPARATUS AND INFORMATION STORAGE MEDIUM WITH LISTING OF ERROR DATA AND LIST ACQUISITION

FIELD

Embodiments described herein relate generally to an information processing apparatus and an information storage medium.

BACKGROUND

A service person deals with an error of an image forming apparatus according to a user manual or a service manual. Correspondingly, a cause of an error occurring in the market may be investigated and registered in a database. A system capable of quickly deciding a countermeasure when the same error occurs again is proposed.

However, the number of cause candidates of the same error is not limited to one. In other words, there may be plural cause candidates of the same error. In such a case, it is difficult to give priority to error handling procedures.

DESCRIPTION OF THE DRAWINGS

FIG. 5 is a diagram illustrating a first list stored in the information processing apparatus according to at least one embodiment;

FIG. 6 is a diagram illustrating an example of a second list stored in the information processing apparatus according to at least one embodiment;

DETAILED DESCRIPTION

In accordance with at least one embodiment, an information processing apparatus comprises a processor and a memory configured to store a command for operating the processor. The processor acquires a first list including a plurality of error data, each of which includes information indicating a cause of an error occurring in an image forming apparatus; adds up the number of occurrence times of each of plural cause candidates relating to the error based on the first list; ranks the plural cause candidates depending on the number of occurrence times; and generates a second list in which each of the plural cause candidates and a rank are associated with each other.

Hereinafter, certain embodiments will be described with reference to the accompanying drawings.

Figure 1:
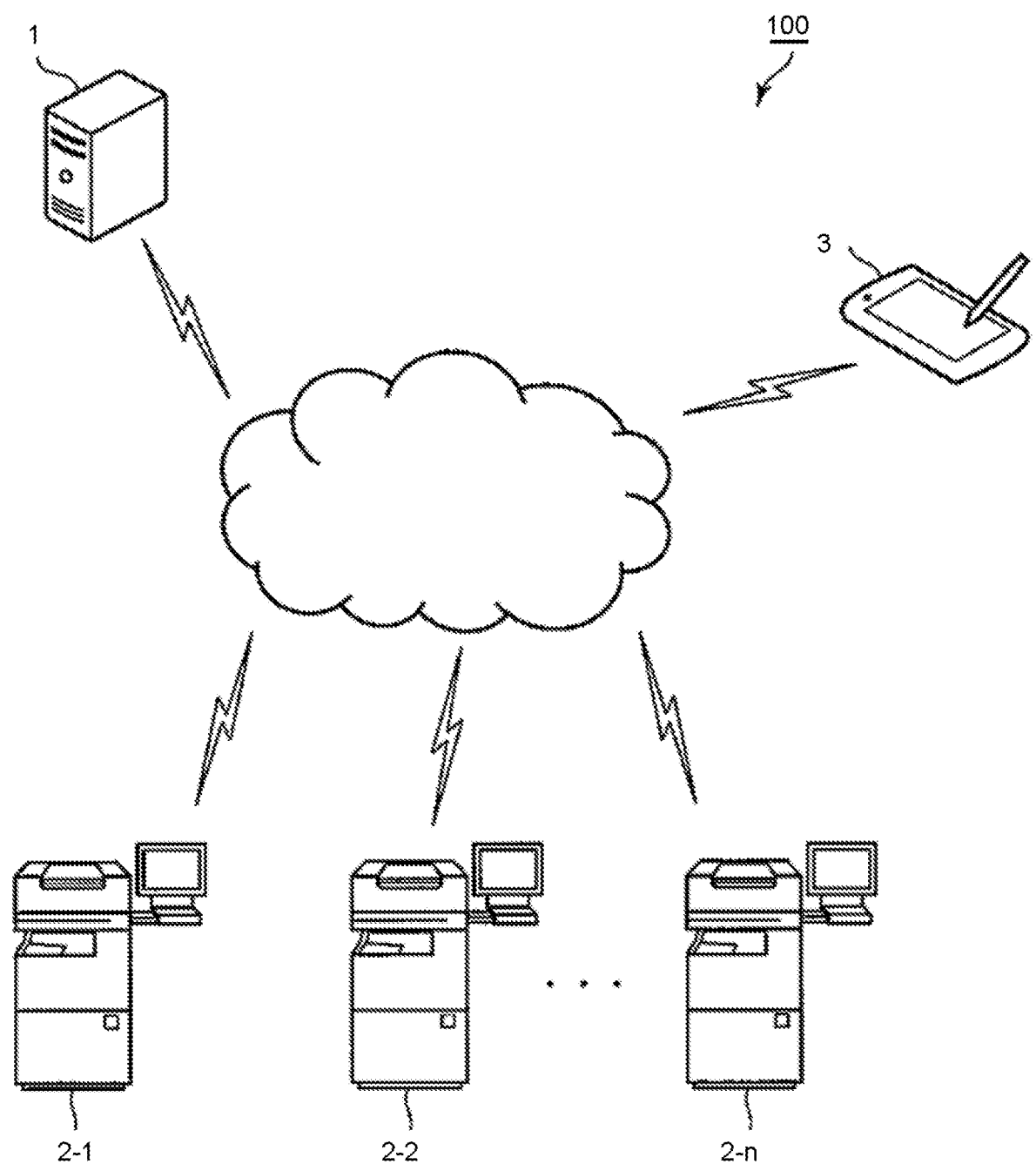
FIG. 1 is a schematic diagram illustrating a configuration of a system including an information processing apparatus according to at least one embodiment.

FIG. 1 is a schematic diagram illustrating a configuration of a system including the information processing apparatus.

The system 100 includes an information processing apparatus 1, image forming apparatuses 2-1 to 2-$n$ (the total number of which is n) and a portable terminal 3. The information processing apparatus 1, n image forming apparatuses 2-1 to 2-$n$ and the portable terminal 3 are connected to a network to be capable of communicating with each other. The number of the image forming apparatuses is arbitrary. The network may be the Internet, for example.

The information processing apparatus 1 collects data and processes the collected data. For example, the information processing apparatus 1 is a server. The information processing apparatus 1 collects a plurality of error data from the image forming apparatuses 2-1 to 2-$n$ and stores a first list including a plurality of error data. The plurality of error data each includes identification information. The identification information is used for identifying an error occurring in the image forming apparatuses 2-1 to 2-$n$. For example, the identification information is an error code. Furthermore, the plurality of error data each includes information indicating an error cause. The information indicating the error cause indicates the cause of an error occurring in one image forming apparatus among the image forming apparatuses 2-1 to 2-$n$. For example, the information indicating the error cause indicates a replacement part. The first list is a database that manages a plurality of error data. An example of the first list is described later. Furthermore, the information processing apparatus 1 generates a second list based on the first list, as described later. The second list is a database in which a rank and each of the plural cause candidates relating to errors are associated with each other. A plurality of the cause candidates are plural candidates of the causes of the errors. The rank indicates a priority of the repair which is associated with each of the plurality of the cause candidates. It can be said that the rank is an order depending on occurrence frequency of the cause candidate. For example, the rank is in the order of 1, 2, 3 . . . in a descending order of priority. The information processing apparatus 1 generates the second list for each error. An example of the second list is described later. Furthermore, the information processing apparatus 1 updates the second list based on acquisition of new error data as described later. Furthermore, the information processing apparatus 1 revises manual data based on the second error list as described later. The manual data contains information relating to each of the plural cause candidates. For example, the manual data contains detailed information relating to each of the plural cause candidates. The detailed information may include information such as a countermeasure corresponding to the cause candidate. For example, the manual data is separate data for each error. The manual may also be referred to as a user manual or a service manual.

The image forming apparatus 2-1 executes a printing process, a scan process, a facsimile process, and the like. For example, the image forming apparatus 2-1 may be an MFP (Multi-Function Peripheral). The image forming apparatuses 2-2 to 2-$n$ may have the same configuration as the image forming apparatus 2-1.

The portable terminal 3 transmits and receives data via the network. For example, the portable terminal 3 may be a smart phone or a tablet.

Figure 2:
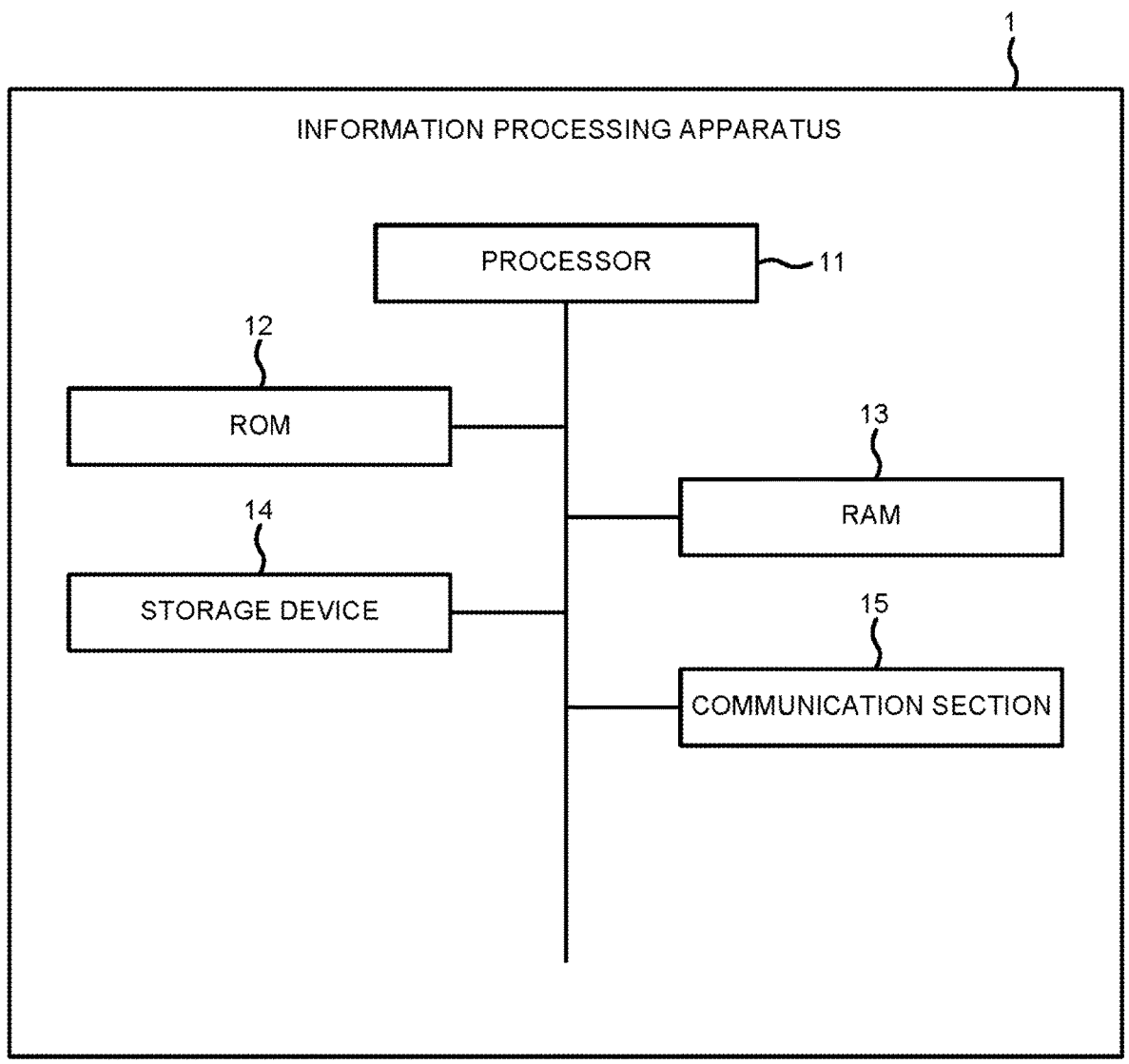
FIG. 2 is a block diagram illustrating a configuration of the information processing apparatus according to at least one embodiment.

FIG. 2 is a block diagram illustrating a configuration of the information processing apparatus 1. The information processing apparatus 1 comprises a processor 11, a ROM (Read Only Memory) 12, a RAM (Random Access Memory) 13, a storage device 14 and a communication section 15.

The processor 11 is an element for executing various processes. For example, the processor 11 is a CPU (Central Processing Unit). The processor 11 executes various processes by executing programs stored in the ROM 12 or the storage device 14.

The ROM 12 stores a program used by the processor 11 to execute various processes or control data, in response to one or more commands issued according to the program. The ROM 12 is an example of a storage section. The RAM 13 is a working memory.

The storage device 14 is a rewritable nonvolatile memory. For example, the storage device 14 is a SSD (Solid State Drive) or a HDD (Hard Disk Drive). The storage device 14 stores programs used by the processor 11 to execute various processes and the control data. Furthermore, the storage device 14 stores data collected in various processes by the processor 11. The storage device 14 stores error data. The storage device 14 stores an error list for each error. The storage device 14 stores the manual data. The storage device 14 is an example of a storage section.

The communication section 15 is used for the information processing apparatus 1 to transmit and receive data to and from other devices via the network. The communication section 15 may include a wired communication interface or may include a wireless communication interface.

Figure 3:
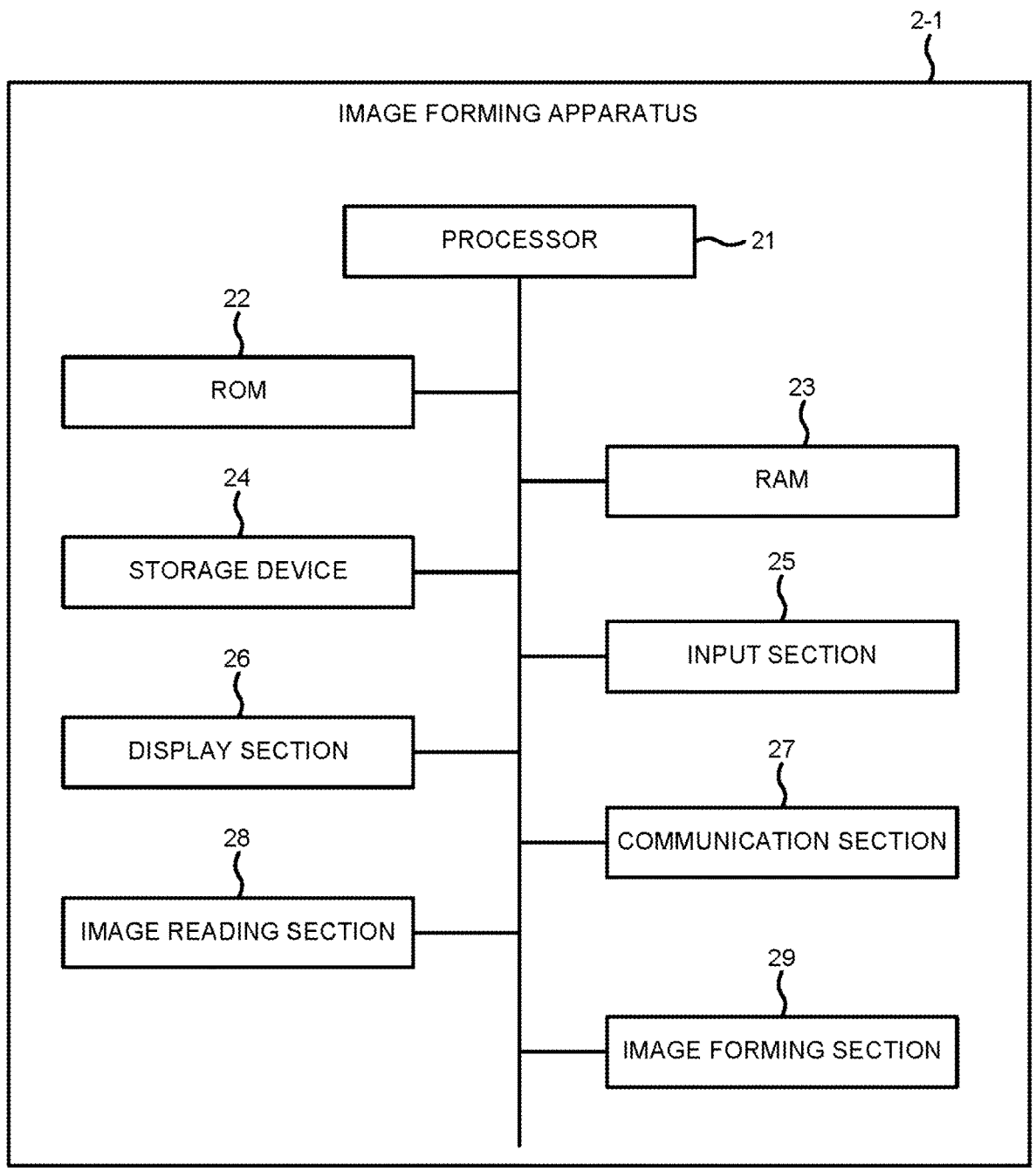
FIG. 3 is a block diagram illustrating a configuration of an image forming apparatus according to at least one embodiment.

FIG. 3 is a block diagram illustrating the configuration of the image forming apparatus 2-1. Since the image forming apparatuses 2-2 to 2-n have the same configuration as the image forming apparatus 2-1, the description thereof is omitted. The image forming apparatus 2-1 comprises a processor 21, a ROM 22, a RAM 23, a storage device 24, an input section 25, a display section 26, a communication section 27, an image reading section 28 and an image forming section 29.

The processor 21 executes various processes. For example, the processor 21 is a CPU. The processor 21 executes various processes by executing programs stored in the ROM 22 or the storage device 24.

The ROM 22 stores programs for the processor 21 to execute various processes or control data. The ROM 22 is an example of the storage section. The RAM 23 is a working memory.

The storage device 24 is a rewritable nonvolatile memory. For example, the storage device 24 is a SSD, a HDD, or the like. The storage device 24 stores programs for the processor 21 to execute various processes or the control data. Furthermore, the storage device 24 stores data collecting in various processes by the processor 21.

The input section 25 receives an input by a user. For example, the input section 25 may be a keyboard or a touch pad stacked on the display section 26 described below.

The display section 26 displays various information. For example, the display section 26 is a liquid crystal display.

The communication section 27 includes an interface for the image forming apparatuses 2-1 to transmit and receive data to and from other devices via the network. The communication section 27 includes an interface for fax communication. The communication section 27 may include a wired communication interface or may include a wireless communication interface.

The image reading section 28 is a scanner that reads a document to acquire image data from the document. For example, the image reading section 28 includes an image sensor. An image senor is an image capturing element in which pixels for converting light to an electrical signal (image signal) are arranged linearly. The image sensor may be, for example, a CCD (Charge Coupled Device) , a CMOS (Complementary Metal Oxide Semiconductor), or another image capturing element.

The image forming section 29 is a printer for forming an image on a printing medium. For example, the image forming section 29 includes a photoconductive drum, an electrostatic charger, an exposure device and a developer. The surface of the photoconductive drum is uniformly charged by the electrostatic charger. The exposure device emits light having a wavelength capable of forming a latent image on the charged photoconductive drum in response to an electric signal of document data or image data to form an electrostatic latent image on the charged photoconductive drum. The developing device attaches toner (developer) to the electrostatic latent image formed on the photoconductive drum to form a toner image on the surface of the photoconductive drum. The image forming section 29 transfers a toner image formed on the surface of the photoconductive drum onto the printing medium and fixes the toner image on the printing medium, thereby forming an image on the printing medium.

Figure 4:
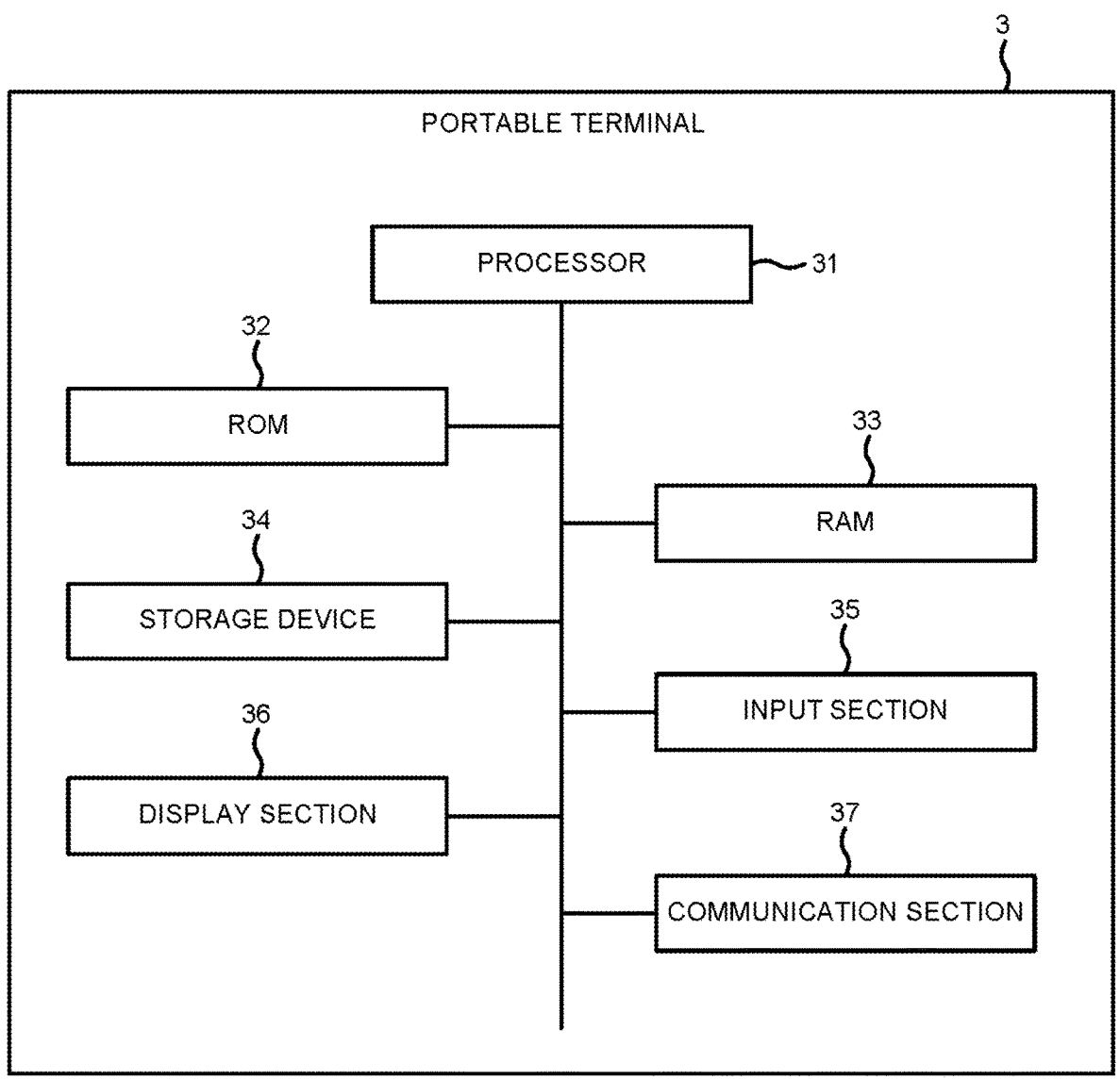
FIG. 4 is a block diagram illustrating a configuration of a portable terminal according to at least one embodiment.

FIG. 4 is a block diagram illustrating a configuration of the portable terminal 3. The portable terminal 3 comprises a processor 31, a ROM 32, a RAM 33, a storage device 34, an input section 35, a display section 36 and a communication section 37.

The processor 31 executes various processes. For example, the processor 31 is a CPU. The processor 31 executes various processes by executing programs stored in the ROM 32 or the storage device 34.

The ROM 32 stores programs for the processor 31 to execute various processes or control data. The ROM 32 is an example of the storage section. The RAM 33 is the working memory.

The storage device 34 is a rewritable nonvolatile memory. For example, the storage device 34 is a semiconductor memory and the like. The storage device 34 stores programs for the processor 31 to execute various processes and the control data. Further, the storage device 34 stores data collected in various processes by the processor 31.

The input section 35 receives an input by the user. For example, the input section 35 is a touch pad stacked on the display section 36 described later.

The display section 36 displays various information. For example, the display section 36 is a liquid crystal display.

The communication section 37 includes an interface for the portable terminal 3 to transmit and receive data to and from other devices via the network. The communication section 37 may include a wired communication interface or may include a wireless communication interface.

Next, a first list stored in the information processing apparatus 1 is described.

FIG. 5 is a diagram illustrating a first list stored in the information processing apparatus 1. The processor 11 stores the error data in the first list each time the error data is acquired. In an example, each time the information processing apparatus 1 receives the error data from the image forming apparatus 2-1, the error data is stored in the first list.

In this example, the service person creates the error data using the input section 25 in the image forming apparatus 2-1 and transmits the error data from the image forming apparatuses 2-1 to the information processing apparatus 1. The same is applicable to the image forming apparatus 2-2 to the image forming apparatus 2-n. In another example, the information processing apparatus 1 may store the error data in the first list each time the error data is received from the portable terminal 3. In this example, the service person creates error data using the input section 35 in the portable terminal 3 and transmits the error data from the portable terminal 3 to the information processing apparatus 1. Thereby, the storage device 14 stores the first list including a plurality of error data. For example, the first list manages the error data in order of storage date and time. The first list manages the identification information and the information indicating the error cause in an associated manner for each error data. For example, the identification information is an error code such as "error 100" or "error 110" in the image forming apparatuses 2-1 to 2-n. For example, the information indicating the error cause indicates a replacement part such as "replacement of part 1" or the like. The information indicating the error cause may also be referred to as the information indicating a repair point. For example, the part 1 is a control substrate, the part 2 is an XXX harness, the part 3 is a YYY sensor, and the like.

Next, the second list stored in the information processing apparatus 1 is described.

FIG. 6 is a diagram illustrating an example of the second list stored in the information processing apparatus 1. The second list shown in FIG. 6 is a list relating to the "error 100". The second list is a list in which the rank is associated with each of the plural cause candidates relating to the "error 100". The plurality of the cause candidates refers to the cause of the errors which are different from each other. For example, a plurality of the cause candidates includes "replacement of part 1", "replacement of part 2" and "replacement of part 3". Each of the plural cause candidates is ranked depending on the number of occurrence times. The rank is set in the order of 1, 2, 3 . . . in a descending order of priority. The number of occurrence times is determined based on the error data relating to the "error 100" among a plurality of the error data included n the first list. The number of occurrence times of each cause candidate corresponds to the amount of the error data including the information indicating the error cause corresponding to each cause candidate among the error data relating to the "error 100".

Figures 7, 8:
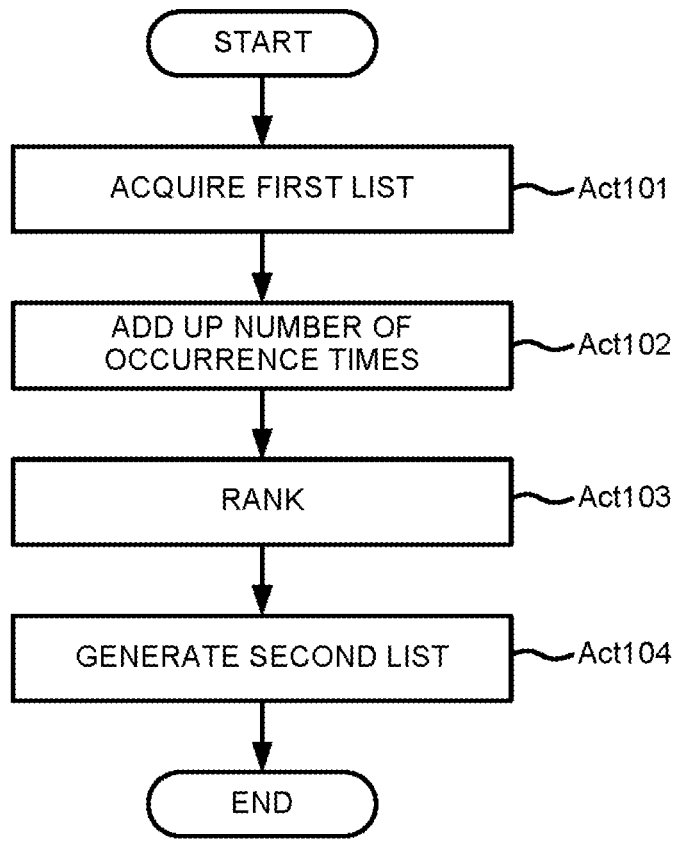
FIG. 7 is a diagram illustrating another example of the second list stored in the information processing apparatus according to at least one embodiment.
FIG. 8 is a flowchart for depicting a generation process by the information processing apparatus according to at least one embodiment.

FIG. 7 is a diagram illustrating another example of the second list stored in the information processing apparatus 1. The second list shown in FIG. 7 is a list relating to the "error 110". The second list is a list in which the rank is associated with each of the plural cause candidates relating to the "error 110". The plurality of the cause candidates refers to the causes of the errors which are different from each other. For example, a plurality of the cause candidates includes "replacement of part 1", "replacement of part 2" and "replacement of part 3". Each of the plural cause candidates is ranked depending on the number of occurrence times. The rank is set in the order of 1, 2, 3 . . . in a descending order of priority. The number of occurrence times is determined based on the error data relating to the "error 110" among a plurality of the error data included in the first list. The number of occurrence times of each cause candidate corresponds to the amount of the error data including the information indicating the error cause corresponding to each cause candidate among the error data relating to the "error 110".

Next, the process by the information processing apparatus 1 is described.

First, a generation process is described. For example, the processor 11 executes the generation process when the second list is not generated yet.

FIG. 8 is a flowchart for depicting the generation process by the information processing apparatus 1. Changes such as replacing a processing order, deleting a part of the process or the like can be made as appropriate.

The processor 11 acquires the first list (Act 101). In Act 101, for example, the processor 11 acquires the first list stored in the storage device 14.

Based on the first list, the processor 11 adds up the number of occurrence times for each of the plural cause candidates relating to the error (Act 102). In Act 102, for example, the processor 11 refers to the identification information included in the error data to select an arbitrary error. The error may be selected from an error having least number which is identified by the identification information. The processor 11 extracts the error data relating to the selected error from the first list. The processor 11 adds up the amount of the error data including the information indicating the error cause corresponding to each cause candidate among the error data relating to the selected error. The processor 11 sets the amount of error data including information indicating the error cause corresponding to each the cause candidate as the number of occurrence times of each cause candidate.

The processor 11 ranks the plural cause candidates according to the number of occurrence times (Act 103). In Act 103, for example, the processor 11 ranks the plural cause candidates in a descending order of the number of occurrence times for the selected error.

The processor 11 generates the second list in which the rank and each of the plural cause candidates are associated with each other (Act 104). In Act 104, for example, the processor 11 generates the second list for the selected error. The processor 11 stores the second list in the storage device 14.

The processor 11 can generate the second list for each error by repeating the processes in Act 101 to 104 for each error. Thereby, the processor 11 can generate the second list for at least one or more assumed errors.

In this way, the information processing apparatus 1 can provide the second list in a format with which the service person can easily grasp the rank of the cause candidate for each error through the generation process. The service person can deal with an error efficiently (in a short time) when the error occurs by attempting the repair in order from the cause candidate which is highly likely to match the error cause.

In Act 103, if the number of occurrence times of the first cause candidate for the first error and the number of occurrence times of the second cause candidate for the first error are the same, the processor 11 may perform the process as follows. For example, the processor 11 considers the rank of the plural cause candidates for the second error different from the first error when ranking the plural cause candidate for the first error. The processor 11 compares the number of occurrence times of the same cause candidate as the first cause candidate with the number of occurrence times of the same cause candidate as the second cause candidate among the plural cause candidates of the second error, and decides the rank of the first cause candidate and the second cause candidate for the first error based on the comparison result.

For example, it is assumed that the first error is an error identified by the "error 100". The first cause candidate of the "error 100" is "replacement of part 1". The second cause candidate of the "error 100" is "replacement of part 2". The number of occurrence times of the first cause candidate of the "error 100" and the number of occurrence times of the second cause candidate of the "error 100" are equal. The second error is an error identified by "error 110". The number of occurrence times of "replacement of part 1" which is the cause candidate of the "error 110" is larger than the number of occurrence times of "replacement of part 2" which is the cause candidate of the "error 110". The processor 11 compares the number of occurrence times of the cause candidate the same as the first cause candidate with that of the cause candidate the same as the second cause candidate among the plural cause candidates of the error identified by the "error 110". Based on the comparison result, the processor 11 determines that the number of occurrence times of "replacement of part 1" is larger than that of "replacement of part 2" for the error identified by "error 110". Based on the comparison result, the processor 11 determines the rank of "replacement of part 1" and "replacement of parts 2" for the error identified by the "error 100". In the error identified by the "error 100", the processor 11 gives a higher rank to "replacement of part 1" compared with "replacement of part 2", like the error identified by the "error 110".

In this way, the information processing apparatus 1 can provide the second list in which the rank is given depending on the degree of accuracy in consideration of the error cause in various errors. The service person can deal with the error efficiently (in a short time) when the error occurs by attempting repair preferentially from the cause candidate with the higher rank regardless of the type of the error.

Next, an update process is described. For example, the processor 11 executes the update process after the second list is generated.

Figure 9:
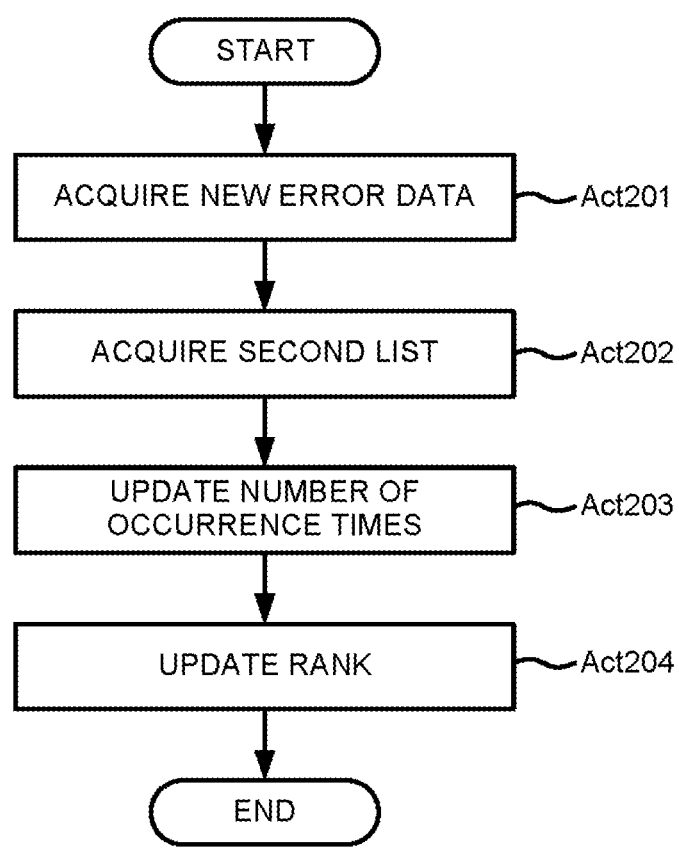
FIG. 9 is a flowchart for depicting an update process by the information processing apparatus according to at least one embodiment.

FIG. 9 is a flowchart for depicting the update process by the information processing apparatus 1. Changes such as replacing a processing order, deleting a part of process or the like can be made as appropriate.

The processor 11 acquires new error data after the second list is generated (Act 201). In Act 201, for example, the processor 11 refers to the creation date and time of the second list and the storage date and time of the error data managed in the first list. The processor 11 acquires new error data from the storage device 14 after the second list is generated.

The processor 11 acquires the second list (Act 202). In Act 202, for example, the processor 11 refers to the identification information included in the new error data. The processor 11 acquires the second list of the error identified by the identification information from the storage device 14.

The processor 11 updates the number of occurrence times based on the acquisition of new error data after the error list is generated (Act 203). In Act 203, for example, the processor 11 refers to the information indicating the error cause contained in new error data. The processor 11 adds the amount of new error data including the information indicating an error cause to the number of occurrence times of the cause candidate corresponding to information indicating the error cause.

The processor 11 updates the rank associated with each cause candidate according to the number of occurrence times after the update (Act 204). In Act 204, for example, the processor 11 ranks the plural cause candidates in a descending order according to the number of the occurrence times after the update.

In this way, the information processing apparatus 1 can provide the second list in which the rank is updated every time new error data is acquired through the update process. By referring to the latest rank given to each of the plural cause candidates, the service person can deal with the error efficiently (in a short time) when the error occurs.

Next, a revision process is described. For example, the processor 11 performs the revision process after the generation process and the update process are executed as described above.

Figure 10:
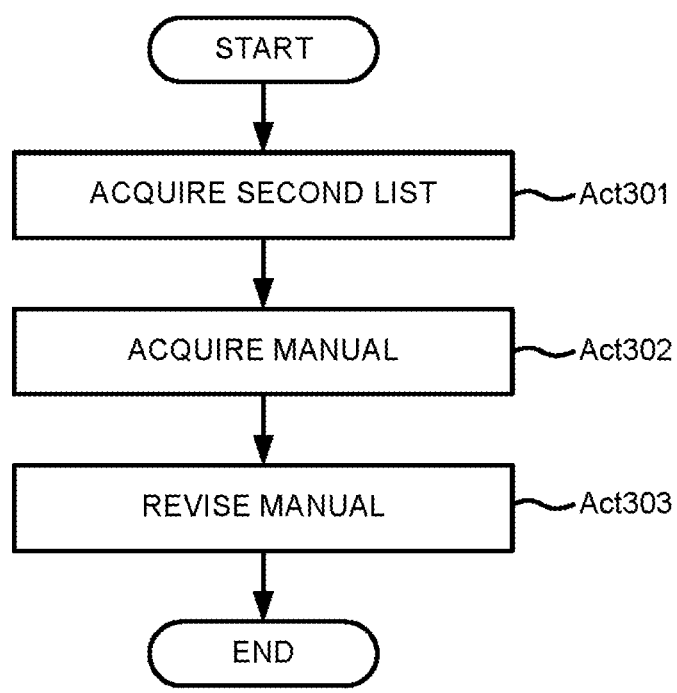
FIG. 10 is a flowchart for depicting a revision process by the information processing apparatus according to at least one embodiment.

FIG. 10 is a flowchart for depicting the revision process by the information processing apparatus 1. Changes such as replacing a processing order, deleting a part of process or the like can be made as appropriate.

The processor 11 acquires the second list (Act 301). In Act 301, for example, the processor 11 arbitrarily selects an error. The error may be selected from an error having the least number which is identified by the identification information. The processor 11 acquires the second list relating to the selected error from the storage device 14.

The processor 11 acquires the manual data (Act 302). In Act 302, for example, the processor 11 acquires the manual data relating to the selected error from the storage device 14.

The processor 11 revises the manual data (Act 303). In Act 303, for example, the processor 11 revises the manual data in such a manner that the sequence of the information relating to the plural cause candidates displayed on a screen is changed according to the rank. For example, the processor 11 changes the sequence of the information relating to the plural cause candidates in such a manner that the information relating to the plural cause candidates is displayed on the screen in the descending order of the rank.

The processor 11 can execute the revision process on the second list corresponding to one or more errors after the generation process described above. The processor 11 can execute the revision process on the second list corresponding to the error subject to the update process after the update process described above.

The order of description in the general manual may be the order in which a creator of the manual can easily write the manual, or an order in which the part becomes cheaper. For this reason, since the service person needs time to search for necessary information, the convenience of the manual is generally low. The information processing apparatus 1 can provide the manual data in a format with which the service person can easily grasp the rank of the cause candidate for each error through the revision process. Since the service person can easily confirm the handling procedure and detailed information of each of the plural cause candidates, it is possible to deal with the error efficiently (in a short time) when the error occurs.

Next, a display process by the image forming apparatus 2-1 is described. For example, the processor 21 executes the display process based on a manual acquisition instruction from the service person. For example, the service person can refer to the identification information of the error displayed on the display section 26 to grasp the occurrence of the error and the content of the error. The service person can input the manual acquisition instruction with the input section 25 for the error identified by this identification information. The display process by each of the image forming apparatuses 2-2 to 2-$n$ may be the same as a manual display process by the image forming apparatus 2-1, and the description thereof is omitted.

Figure 11:
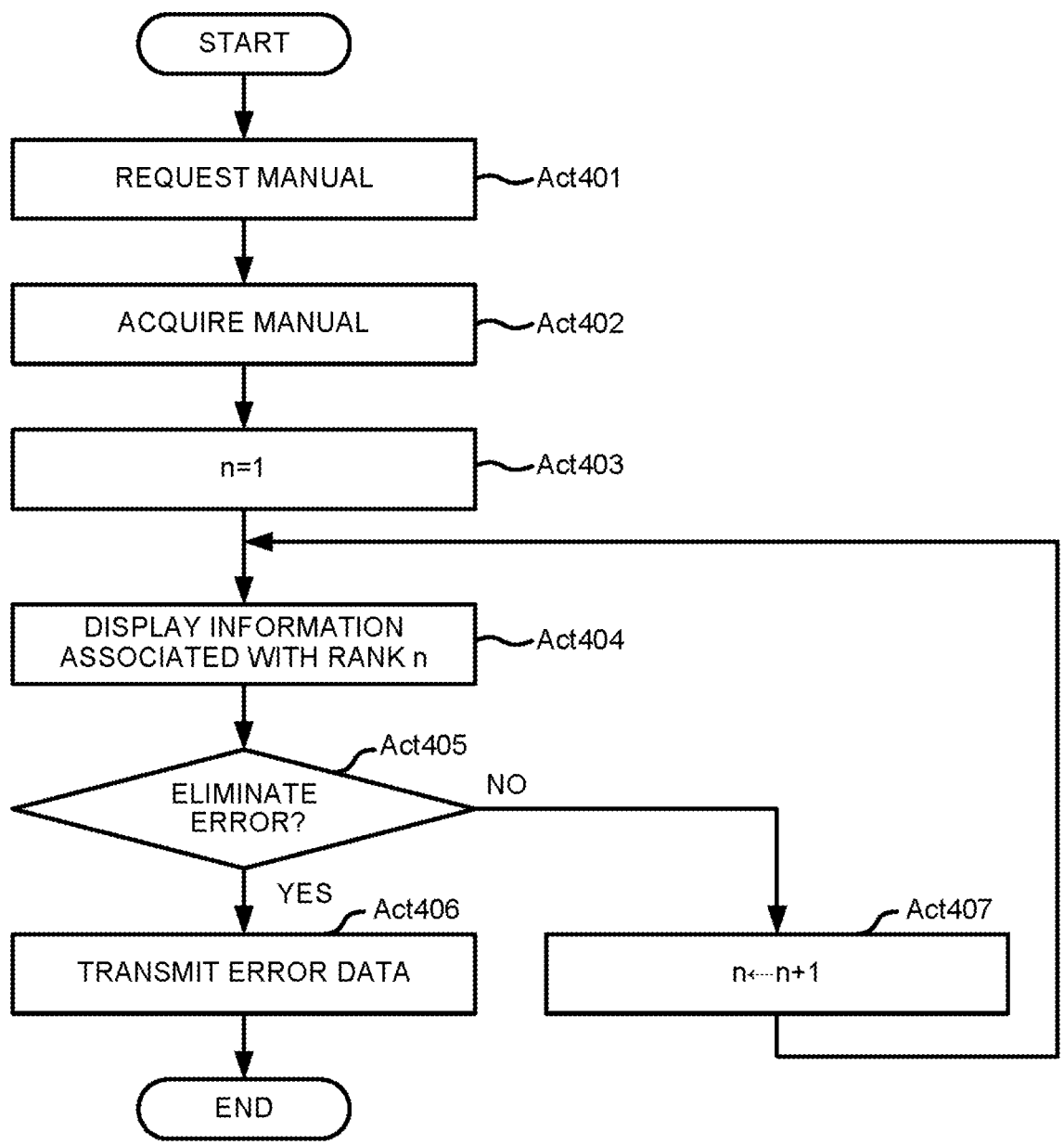
FIG. 11 is a flowchart for depicting a display process by the image forming apparatus according to at least one embodiment.

FIG. 11 is a flowchart for depicting the manual display process by the image forming apparatus 2-1. Changes such as replacing a processing order, deleting a part of process or the like can be made as appropriate.

The processor 21 requests the manual data (Act 401). In Act 401, for example, the processor 21 outputs a request to the information processing apparatus 1 via the communication section 27 based on the manual acquisition instruction from the service person in the input section 25. The request is a request for the manual for an error selected by the service person (hereinafter, referred to as a selected error). In response to the request from the image forming apparatus 2-1, the processor 11 of the information processing apparatus 1 outputs the manual data to the image forming apparatus 2-1 via the communication section 15.

The processor 21 acquires the manual data (Act 402). In Act 402, for example, the processor 21 acquires the manual data for the selected error from the information processing apparatus 1 via the communication section 27.

The processor 21 sets a variable n indicating the rank to 1 (Act 403). In Act 403, for example, the processor 21 receives an instruction to display the information relating to the cause candidate associated with the rank 1 from the service person through the input section 25. The processor 21 sets the variable n to 1 based on the display instruction.

The processor 21 displays the information relating to the cause candidate associated with the rank n (the rank corresponding to the variable n) on the display section 26 (Act 404). In Act 404, for example, the processor 21 displays the information relating to the cause candidate associated with the rank n based on the setting of the variable n on the display section 26. If the variable n is 1, the processor 21 displays the information relating to the cause candidate associated with the rank 1 on the display section 26. As a result, the service person can repair the image forming apparatus 2-1 while confirming the information relating to the cause candidate associated with the rank n.

The processor 21 determines whether or not the error is eliminated (Act 405). In Act 405, for example, the processor 21 receives a register instruction by the service person in the input section 25. The register instruction includes a message indicating elimination of the error and the error cause contributing to the error elimination. The error cause is to specify at which step the repair can be performed when the error is repaired. The processor 21 determines that the error is eliminated based on the register instruction by the service person in the input section 25.

If the error is eliminated (Yes in Act 405), the processor 21 transmits the error data (Act 406). In Act 406, for example, the processor 21 outputs the error data to the information processing apparatus 1 via the communication section 27. The error data includes the identification information of the error occurring in the image forming apparatus 2-1 and the information indicating the error cause contributing to error elimination. For example, since it is possible to grasp the identification information of the error when the error occurs, the processor 21 can contain the identification information in the error data. The processor 21 can include the error cause in the error data based on the register instruction input by the service person through the input section 25. As a result, the information processing apparatus 1 can store the error data received from the image forming apparatus 2-1 in the first list.

If the error is not eliminated (No in Act 405), the processor 21 sets a value acquired by adding 1 to the variable n as a new variable n (Act 407). In Act 407, for example, the processor 21 receives an instruction to display the information relating to the cause candidate associated with the next rank from the service person through the input section 25. The processor 21 sets a new variable n based on the display instruction. The processor 21 proceeds to the process in Act 404. In Act 404, for example, the processor 21 displays the information relating to the cause candidate associated with the next rank 2 following the rank 1 on the display section 26.

As a result, the image forming apparatus 2-1 can display the handling procedure of the error in the descending order of the rank based on the display instruction from the service person. A service person can attempt the repair starting from the cause candidate which is highly likely to match the error cause, and thus, the server person can handle with the error efficiently (in a short time) when the error occurs.

The portable terminal 3 can execute the display process shown in FIG. 11 like the image forming apparatus 2-1. In this case, the processor 31 of the portable terminal 3 executes the processes in Act 401 to Act 407 similarly to the processor 21 of the image forming apparatus 2-1. In Act 406, the processor 31 displays, on the display section 36, a screen for requiring input of the identification information of the error occurring in the image forming apparatus 2-1 and the information indicating the error cause contributing to the error elimination. The processor 31 receives the register instruction from the service person through the input section 35. The register instruction includes the identification information of the error occurring in the image forming apparatus 2-1, the message indicating that the error is eliminated, and the error cause contributing to the error elimination. The processor 31 can include the identification information of the error and the error cause in the error data based on the register instruction input by the service person through the input section 35. As a result, the processor 31 can output the error data to the information processing apparatus 1 via the communication section 37.

The programs used for the processor to execute various processes may be installed in a device from an information storage medium in which the programs are stored. The information storage medium is a non-transitory computer readable medium. For example, the information storage medium is a CD (Compact Disc)-ROM or the like. The information storage medium is not limited thereto, and it may be any medium as long as it is a storage medium readable by the device.

While certain embodiments have been described, these embodiments have been presented by way of example only, and are not intended to limit the scope of invention. Indeed, the novel apparatus and methods described herein may be embodied in a variety of other forms. Furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a processor configured to
acquire a first list including a plurality of error data, each of which includes information indicating a cause of an error occurring in an image forming apparatus,
add a number of occurrence times of each of plural cause candidates relating to the error based on the first list, rank the plural cause candidates depending on the number of occurrence times, and
generate a second list in which each of the plural cause candidates and a rank are associated with each other; and
a memory configured to store a command for operating the processor,
wherein when the number of occurrence times of a first cause candidate of a first error is the same as that of a second error candidate of the first error, the processor is configured to compare the number of occurrence times of a cause candidate that is the same as the first cause candidate with that of a cause candidate that is the same as the second cause candidate among the plural cause candidates relating to a second error different from the first error, and to determine a rank of the first cause candidate and the second cause candidate for the first error based on a result of the comparison.

2. The information processing apparatus according to claim 1, wherein
the processor is configured to update the number of occurrence times based on acquisition of new error data after generation of the second list, and update the rank associated with each of plural cause candidates according to the number of occurrence times after updating the number of occurrence times.

3. The information processing apparatus according to claim 1, wherein
the processor is configured to acquire manual data including information relating to each of the plural cause candidates, and revise the manual data such that a sequence of the information relating to each of the plural cause candidates displayed on a screen is changed according to the rank.

4. The information processing apparatus according to claim 1, wherein the rank indicates a priority of repair associated with each of the plural cause candidates.

5. The information processing apparatus of claim 1, wherein the number of occurrence times of each of the plural cause candidates corresponds to an amount of error data including information indicating a cause corresponding to each of the plural cause candidates among the plurality of error data.

6. The information processing apparatus according to claim 3, wherein the processor is configured to cause the screen to display information relating to the plural cause candidates in descending order of rank.

7. A non-transitory information storage medium for storing a program, which, when executed by a processor, causes the processor to:
acquire a first list including a plurality of error data, each of which includes information indicating a cause of an error occurring in an image forming apparatus;
add a number of occurrence times of each of plural cause candidates relating to the error based on the first list;
rank the plural cause candidates depending on the number of occurrence times;
generate a second list in which each of the plural cause candidates and a rank are associated with each other, and
when the number of occurrence times of a first cause candidate of a first error is the same as that of a second error candidate of the first error, compare the number of occurrence times of a cause candidate that is the same as the first cause candidate with that of a cause candidate that is the same as the second cause candidate among the plural cause candidates relating to a second error different from the first error, and determine a rank of the first cause candidate and the second cause candidate for the first error based on a result of the comparison.

8. The information storage medium according to claim 7, wherein
the processor is configured to update the number of occurrence times based on acquisition of new error data after generation of the second list, and update the rank associated with each of plural cause candidates according to the number of occurrence times after updating the number of occurrence times.

9. The information storage medium according to claim 7, wherein
the processor is configured to acquire manual data including information relating to each of the plural cause candidates, and revise the manual data such that a sequence of the information relating to each of the plural cause candidates displayed on a screen is changed according to the rank.

10. The information storage medium according to claim 7, wherein the rank indicates a priority of repair associated with each of the plural cause candidates.

11. The information storage medium of claim 7, wherein the number of occurrence times of each of the plural cause candidates corresponds to an amount of error data including information indicating a cause corresponding to each of the plural cause candidates among the plurality of error data.

12. The information storage medium according to claim 9, wherein the processor is configured to cause the screen to display information relating to the plural cause candidates in descending order of rank.

13. An information processing method, comprising:
acquiring, by a processor, a first list including a plurality of error data, each of which includes information indicating a cause of an error occurring in an image forming apparatus;
adding a number of occurrence times of each of plural cause candidates relating to the error based on the first list;
ranking the plural cause candidates depending on the number of occurrence times;
generating a second list in which each of the plural cause candidates and a rank are associated with each other, and
when the number of occurrence times of a first cause candidate of a first error is the same as that of a second error candidate of the first error, comparing the number of occurrence times of a cause candidate that is the same as the first cause candidate with that of a cause candidate that is the same as the second cause candidate among the plural cause candidates relating to a second error different from the first error, and determining a rank of the first cause candidate and the second cause candidate for the first error based on a result of the comparison.

14. The information processing method according to claim 13, further comprising:
updating the number of occurrence times based on acquisition of new error data after generation of the second list, and updating the rank associated with each of plural cause candidates according to the number of occurrence times after updating the number of occurrence times.

15. The information processing method according to claim 13, further comprising:

acquiring manual data including information relating to each of the plural cause candidates, and revising the manual data such that a sequence of information relating to each of the plural cause candidates displayed on a screen is changed according to the rank.

16. The information processing method according to claim 13, wherein the rank indicates a priority of repair associated with each of the plural cause candidates.

17. The information processing method of claim 13, wherein the information indicating the cause of the error includes information indicating a replacement part.

* * * * *